United States Patent [19]
Skachko et al.

[11] 3,721,793
[45] March 20, 1973

[54] SPIRAL-SEAM WELD PIPE AND TUBE MILL

[75] Inventors: Jury Nikolaevich Skachko; Venedikt Feofanovich Moshkin; Rodimiz Ivanovich Gazkaljuk; Vladimirovich Popov; Valery Vasilievich Polukhin, all of Kiev; Igor Illarinovich Kazakevich, Moskovskaya oblast, Elektrostal; Alexandr Nikolaevich Medvedov, Mosovskaya oblast, Elektrostal; Vladimir Alexandrovich Korshunov, Moskovskaya oblast, Elektrostal; Vladimir Mikhailovich Bokov, Moskovskaya oblast, Noginsk; Boris Pavlovich Skorudsky, Moskovskaya oblast, Elektrostal, all of U.S.S.R.

[73] Assignee: Institut elektrosvarki imeni E.O. Patona Akademii Nauk Ukrainskoi SSR, Kiev, U.S.S.R.

[22] Filed: July 19, 1971

[21] Appl. No.: 163,755

[52] U.S. Cl. ...................... 219/62, 219/8.5, 228/44
[51] Int. Cl. ................................................. B23k 1/16
[58] Field of Search ....... 219/62, 59, 67, 8.5; 228/29, 228/44, 49

[56] References Cited

UNITED STATES PATENTS

| | | | |
|---|---|---|---|
| 2,013,517 | 9/1935 | Kachel | 219/62 X |
| 3,287,536 | 11/1966 | Fay | 219/62 |
| 1,238,986 | 9/1917 | Colby | 219/62 X |
| 1,878,376 | 9/1932 | Cammen | 219/62 |

*Primary Examiner*—C. L. Albritton
*Assistant Examiner*—L. A. Schutzman
*Attorney*—Holman & Stern

[57] ABSTRACT

A mill is provided with a device for pipe or tube forming by strip wrapping into a spiral, a device for the pressure welding of convergent edges of a strip and pipe, being formed therefrom and a device for locating the strip to form it into the spiral and to weld the convergent edges of the strip and pipe, being formed therefrom. The pipe forming device comprises at least two pairs of rolls arranged opposite each other in the direction of the strip motion or movement so that the roll exteriors act as guides for abutting convergent edges of the strip during the welding process, with one roll in each pair being mounted outside and the other roll inside the pipe (tube) to be formed. The geometric axes of the external rolls are disposed at right angles to the direction of the strip movement and those of the internal rolls — at an angle to the direction of the pipe movement less than the angle defined by the axis of the external rolls and the direction of the pipe movement.

5 Claims, 6 Drawing Figures

SPIRAL-SEAM WELD PIPE AND TUBE MILL

BACKGROUND OF THE INVENTION

The present invention relates to facilities for the production of spiral-seam tubes and pipes and more particularly to spiral-seam weld pipe and tube mills.

The present invention proves itself in the fabrication of gas and oil pipes, but is also applicable to the manufacture of cylindrical shells, metal panels, etc.

PRIOR ART

Known in the prior art is a spiral-seam weld pipe and tube mill, incorporating a device for strip forming a spiral into a pipe, a device for pressure welding convergent edges of the strip and the pipe being formed therefrom, and a strip locating device for forming it into a spiral and the ensuing welding of the convergent edges of the strip and pipe or tube being formed therefrom (GFR Patent N 920485, Cl.7b 9/01).

In the known mill, a device for spiral forming a pipe or a tube from a strip comprises a revolving mandrel enclosed in the pipe being formed, and rolls pressing the strip against the mandrel. The roll axes are perpendicular to the direction of the strip motion.

Locating of both the strip and pipe or tube during welding as well as applying pressure to the weld joint is by means of a roller, against which the external edge of the strip rests. An axial component of the pressure face applied to the weld joint arises due to friction when the pipe, being formed, is moving along the mandrel. A radial component is generated by a seam-welding roller.

The above device suffers from a number of drawbacks. First and foremost, the axial component of the pressure force varies with changes, even negligible, in the pipe diameter, which may be the result, in the first place, of variations of geometric parameters of the strip. Welding of a pipe from a strip having a slight curvature, e.g., a camber, presents also a serious problem.

The above device does not lend itself to the application of high-frequency welding, since an inner mandrel tends to shield a clearance between the convergent edges during the welding operation which may lead to an extremely irregular heating of these edges. In addition, the production of a different diameter pipe requires the replacement of the mandrel to suit the pipe diameter.

The present invention is, in essence, aimed at developing a spiral-seam weld pipe and tube mill allowing the use of high-frequency welding, which has the inherent advantage of being able to produce high-quality welds, high production rates and efficiency along with the possibility of welding various steel grades and a diversity of alloys on ferrous and non-ferrous metal bases.

SUMMARY OF THE INVENTION

The above as well as other objects of the present invention are achieved by the fact that in a spiral-seam weld pipe and tube mill having a device for pipe forming by the spiral method, i.e., by forming the spiral into a pipe, a device for the pressure welding of the convergent edges of the strip and of the pipe or tube, to be formed, and a device for locating the strip to form it into a spiral and to weld the convergent edges of the strip and the pipe or tube, being formed, according to the present invention, the pipe forming device comprises at least two pairs of rolls, arranged in the direction of the strip motion or movement, one opposite another, by virtue of which the roll surfaces act as guides for abutting the convergent edges during welding, with one roll in each pair mounted outside and the other roll inside of the pipe being formed in such a manner that the geometric axes of the external rolls are disposed at a right angle to the direction of the strip motion and those of the internal rolls at an angle to the direction of the pipe motion less than the angle formed by the axis of the external rolls and the direction of the pipe motion.

To adjust for alterations in the diameter of the pipe or tube being formed, it is expedient to fit the pipe forming device with a displacement device whose function is to displace, in the course of welding, one roll pair relative to the other in a direction perpendicular to the plane in which the strip is travelling.

The mill may be equipped with the displacement device incorporating two shafts, one carrying the internal rolls fastened thereon and the other the external rolls, two eccentric sleeves mounted on the shafts with the rolls of one pair set up on the shafts and those of the second pair on eccentric sleeves, and a drive for synchronous setting rotation of the sleeves.

It is sound practice to choose both the arrangement of the internal and external rolls and the shape of their exteriors so that the clearance therebetween complies with the strip thickness, forming the profile of the pipe or tube, being produced.

To keep the joints being welded from tapering, the roll surfaces abutting directly against the edges of the strip and pipe in the weld area are cone-shaped.

Further objects and advantages of the invention will become more fully apparent to persons skilled in the art from the following detailed description and drawings of an exemplary embodiment and in which drawings:

BRIEF DESCRIPTION OF THE DRAWINGS

FIG. 1 is a diagrammatic view of the working elements of the mill, ensuring the formation of a spiral pipe (tube) to be welded further on;

DETAILED DESCRIPTION OF THE INVENTION

The spiral-seam weld pipe and tube mill is defined by a series of devices and gears arranged in a single line in the direction stipulated by the technology adopted, including a device for preparing the strip for subsequent spiral forming into a pipe (tube), a device for locating the strip for spiral forming into a pipe (tube) and for welding the convergent strip edges and the pipe (tube) being formed, a device for pipe forming by strip wrapping into a spiral, a device for the pressure welding of the strip convergent edges and of the pipe (tube) being formed, and, finally a device for cutting and subsequent processing of welded pipes or tubes.

Figure 1:
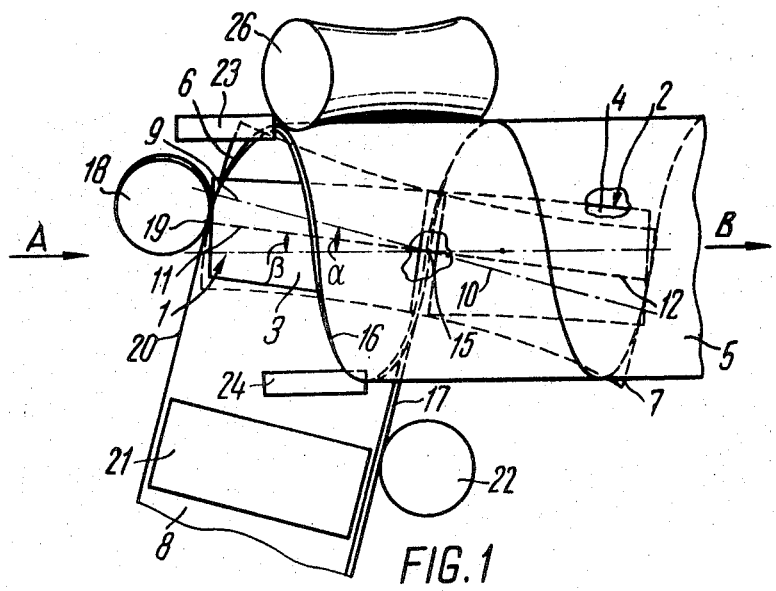

The device for forming a pipe or tube by the spiral method comprises two pairs 1 and 2 (FIG. 1) of rolls, facing each other. In relation to a pipe 5 being formed, one roll of either pair, rolls 3 and 4 respectively will be internal and the other rolls 6 and 7 external.

Figure 2:
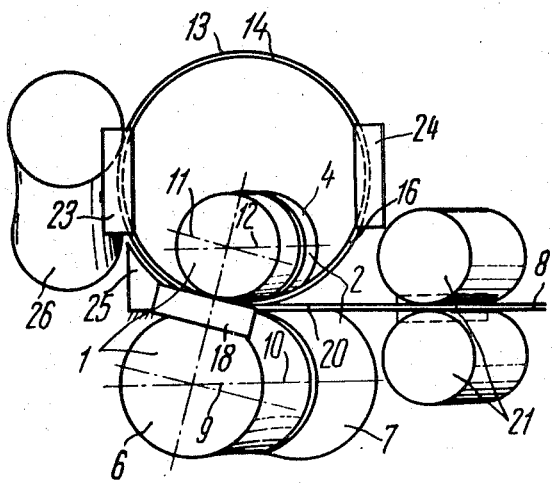
FIG. 2 is a view looking in the direction of arrow A in FIG. 1.

Rolls 3 and 6 of pair 1 and rolls 4 and 7 of pair 2 are disposed so that a gap between their exterior surfaces corresponds to the thickness of a strip 8. External rolls 6 and 7 are arranged perpendicular to the direction of movement of the strip 8 and pipe 5 being formed therefrom. Geometric axes 9 and 10 of external rolls 6, 7 are located at an acute angle "α" to the direction of movement of the pipe 5 being formed. Axes 11 and 12 of the internal rolls also define an acute angle "β" to the direction of movement of the pipe being formed, with the β angle being smaller than the α angle, defined by the external rolls. Configuration of the surface of rolls 3,4, 6 and 7 and the arrangement of axes 11 and 12 of the internal rolls 3 and 4 relative to axes 9 and 10 of the external rolls 6 and 7 have been chosen in such a manner that the roll gap will be formed by cylindrical surfaces 13 and 14 (FIG. 2), corresponding to external 15 and internal 16 surfaces of the pipe or tube 5, being welded (formed). Rolls 3 and 4 are mounted opposite another pair 2 of rolls 6 and 7 so that the exteriors of the rolls act as guides, ensuring a pre-set mutual arrangement of edges 18 and 19 of pipe 5 and strip 8 in weld area 17 (FIG. 1) with one pair 2 of the rolls capable of guiding the pipe wall and another pair 1, the strip, being bonded thereto by welding.

At least one of the rolls and preferably all of them are fitted with drives (not shown in the drawing) to assure the movement of both the strip and the pipe during forming and welding. The pipe forming device incorporates upset mechanisms (not shown), whose object is to assure a requisite pressure application to the convergent edges of both the strip and pipe or tube. The mechanisms are linked mechanically with at least one of the rolls in each pair, providing for bringing together the rolls of each pair so that as strip 8 is travelling, frictional forces will arise between the exteriors of rolls 3, 4, 6 and 7 and strip 8. The pipe forming device incorporates also a device, shown in FIG. 3 for displacing one roll pair relative to another in the course of welding. The device is also linked mechanically with the rolls of at least one pair, providing for their common synchronous displacement in a direction, which does not coincide with the plane of the strip motion. The above device serves also for changing the diameter of the pipe or tube, being welded, where they are produced of a non linear strip.

The device, designed for spiral forming of a strip into a pipe or tube and for welding it, is fitted with a mechanism for locating the strip and pipe (tube) for forming the strip into the pipe and subsequent welding. The device comprises a thrust member, for instance, tappet roller 20 (FIG. 1), mounted outside of pipe 5 opposite rolls 3 and 6, whose function is to hold strip 8 during welding in bite area 21, in which the strip 8 is gripped by rolls 3 and 6, with the roller being in cooperation with external edge 22 of strip 8 in the contact zone of the strip and rolls 36, which represents bite area 21 where strip 8 is gripped by rolls 3 and 6. In addition, the device for locating both the strip and the pipe (tube) comprises appliance 23 for making the strip 8 fast before it has entered rolls 3, 4, 6 and 7 of the device for the spiral forming of the strip into a pipe (tube) and appliance 24 (FIGS. 1 and 2) for making fast the welded pipe (tube).

To insure initiation of the welding process, i.e., to form the first convolution of a spiral, the mill is equipped with a guide sleeve 25 disposed behind rolls 3, 4, 6 and 7, which serve to form the strip into a pipe (tube).

Apart from the above devices, the mill incorporates rolls 26, whose object is to relieve partially a still hot joint from the stresses, arising therein as the pipe (tube) is being formed.

Figure 3:
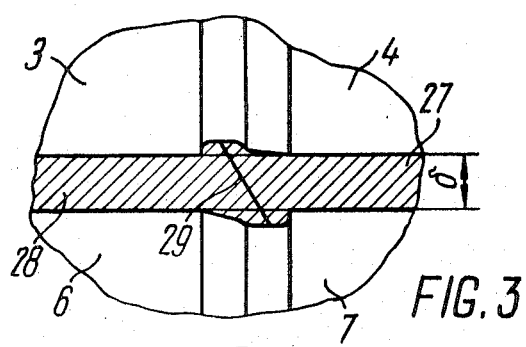
FIG. 3 is a cross-sectional view of a weld joint without displacement of the convergent edges of the strip and pipe.

In the exemplary embodiment, illustrated in FIG. 3, when a pipe (tube) is welded by joining together the edge of a pipe 27 and that of a straight-line strip 28, no displacement is permitted in joint 29 and both pairs 1 and 2 of rolls 3, 6 and 4, 7 of the device for forming the pipe 5 are arranged in such a manner that the gap between one roll pair is a continuation of that between another roll pair without mutual displacement.

Figure 4:
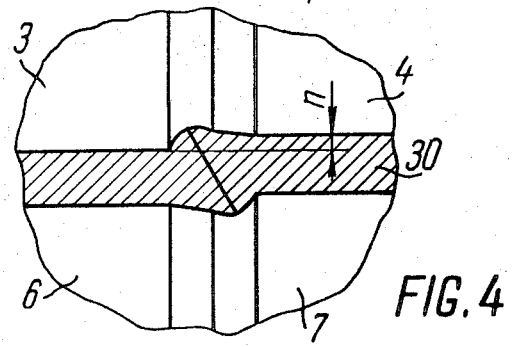
FIG. 4 is a cross-sectional view of a weld joint with a pre-set outward displacement of the strip relative to the pipe (tube)
Figure 5:
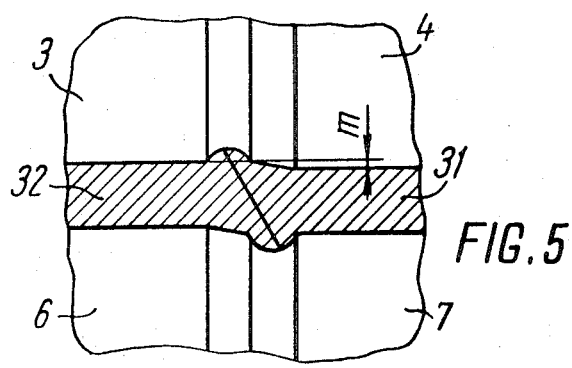
FIG. 5 is a cross-sectional view of a weld joint with a pre-set inward displacement of the strip relative to the pipe (tube)

With the arrangement depicted in FIG. 4, when strip 30 is not a straight-line, as well as with the arrangement, shown In FIG. 5, when for some reason or other it is necessary to produce a different diameter of pipe (tube) 31, as against the diameter, being welded, use is made of the roll displacement device which shifts one roll pair with regard to another pair. Displacements "n" (FIG. 4) and "m" (FIG. 5) in the gap of one roll pair relative to that of another pair cause the edges of both the strip and pipe (tube) to displace also. Where the edge of strip 32 is displaced (deflected) outward with regard to that of pipe 31 (FIG. 4), the diameter of the pipe (tube) being welded is increased. If the edge of strip 32 (FIG. 5) is displaced (deflected) inward with regard to that of pipe 31 being welded a decrease in the pipe diameter follows. In the region adjacent to the weld area, the rolls of the above device are tapered, by virtue of which reinforcement of the weld is achieved in the weld area when pressure is applied thus tending to keep the joint strength from being reduced due to edge displacement.

Figure 6:
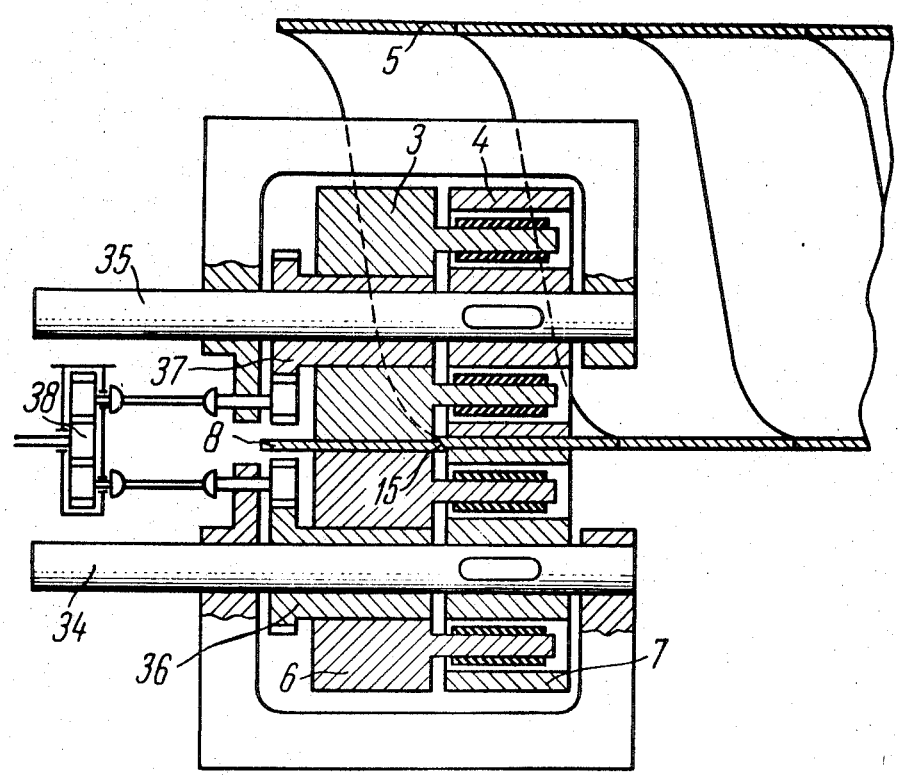
FIG. 6 is a longitudinal cross-sectional view of the displacement device in the course of welding providing for a displacement of one roll pair with regard to the other pair.

The device for displacing one roll pair 3,6 of the pipe forming mechanism relative to another roll pair 4, 7 in the course of welding (FIG. 6) consists of two shafts 34 and 35 with external rolls 6 and 7 being carried by shaft 34, and internal rolls 3 and 4 being carried by shaft 35. The shafts 34 and 35 carry eccentric sleeves 36 and 37, respectively. The rolls 7 and 4 of one pair are fastened directly on the shafts 34 and 35, per se, while the rolls 3 and 6 of another pair are carried by the eccentric sleeves 37 and 36. The displacement device is also provided with drive 38, ensuring a synchronous setting rotation of the eccentric sleeves 36 and 37. Displacement of one roll pair relative to the other one is accomplished by revolving the eccentric sleeves 36 and 37. As rolls 3, 4, 6 and 7 rotate in the course of strip forming and welding, mutual displacement of pairs 1 and 2 of rolls 3, 4, 6 and 7 remains constant.

In service, strip 8 is fed by means of the strip preparatory device into the forming and welding device. Strip preparation may involve uncoiling, end-to-end butting of new and previous coils (abutting of the front end of a new coil and the rear end of the preceding), straightening, slitting to obtain a pre-set width, edge chamfering, etc. The appliances 23 and 24 locate the strip being fed in a feed plane in a direction perpendicular to the strip feed plane. Upon being admitted into the gap between the first pair 1 of the rolls of the forming device, the strip 8 is curved into a spiral. When forming the first convolution, guide sleeve 25 is tightened at the beginning of the forming procedure so that the diameter of the first convolution produced equals the pipe (tube) diameter and the angle of inclination of the spiral matches up that of the spiral seam made on the welded pipe (tube).

After the strip has entered the gap between the second pair 2 of rolls 4 and 7, intended for making fast the wall of the pipe 5 during welding, and the abutting edges 19 and 18 respectively of the strip and pipe (tube) are brought together the welding process is initiated. Preheating of edges for subsequent welding is effected, for instance, by high-frequency currents through the use of resistance or induction welders. The welds produced are pressed under the influence of frictional forces arising between the exterior of the internal roll 4 locating the pipe (tube) wall and the wall of pipe 14. The friction force is directed from the pipe (tube) to the strip, being determined by the value of pressure of the rolls on the pipe wall.

The locating device and tappet roller 20 restrict the pipe displacement toward the strip and the transverse position of the strip, determining thereby the pressure on a weld joint. The diameter of the pipe (tube) being seam-welded is adjusted by mutual displacement of the roll pairs. To achieve this use is made, for instance, of the drive 38, which revolves the sleeves 36 and 37 on shafts 34 and 35 of the displacement device. An impulse for adjusting the pipe diameter may be obtained either by means of a device for measuring the diameter of the welded pipe (tube) or by a device intended for estimating the strip deflection.

The economic effect obtained by the application of the present invention is by the high-frequency welding which results in a substantial reduction in investment, higher production rates obtained on the same equipment, a decrease in power input, in requirements for auxiliary materials, the number of attendants as well as a reduction in the consumption and cost of tooling, the possibility of using a strip of an inferior quality, etc.

What is claimed is:

1. A spiral-seam weld pipe and tube mill, embodying: a device for pipe forming by strip wrapping into a spiral, comprising at least two pairs of rolls, said pairs of rolls being arranged opposite each other in the direction of the strip movement so that the surfaces of the rolls act as guides for abutting convergent edges of the strip during the welding operation, one roll of each pair being mounted outside and other roll inside of the pipe to be formed, the geometric axes of the external rolls being disposed at a right angle to the direction of the strip movement and the geometric axes of the internal rolls at an acute angle to the direction of the pipe movement less than the angle defined by the axes of the external rolls and the direction of the pipe motion: a device for the pressure welding of convergent edges of the strip and pipe being formed from it; and a device for locating the strip to form the strip into a spiral and to weld the convergent edges of the strip and pipe being formed.

2. The mill as claimed in claim 1, in which the pipe forming device comprises means for displacing, during welding, one roll pair relative to the other roll pair in a direction perpendicular to the plane of strip motion to adjust all changes in the diameter of the pipe being formed.

3. The mill as claimed in claim 2, in which the displacement means includes two shafts, one of the shafts carrying the internal rolls and the other shaft carrying the external rolls, an eccentric sleeve mounted on each shaft, the internal rolls of one pair being carried by the eccentric sleeve, the internal roll of the other pair being carried by the eccentric sleeve and the external roll of the other pair being fastened on said other shaft respectively, and a drive for synchronous setting rotation of the eccentric sleeves.

4. The mill as claimed in claim 1, in which both the arrangement of the internal and external rolls and the profile of their exterior surfaces are chosen so that the roll gap matches up the thickness of the strip and forms a profile of the pipe being formed.

5. The mill as claimed in claim 1, in which the section of the exterior surfaces of the rolls directly adjacent to the strip and pipe edges in the weld area are chamfered to keep the joint being welded from possible tapering.

* * * * *